United States Patent [19]

Komori et al.

[11] Patent Number: 4,954,536
[45] Date of Patent: Sep. 4, 1990

[54] BRAKE-FRICTION MATERIAL

[75] Inventors: Teruyuki Komori; Shingo Miyake, both of Yokohama; Yoshio Senoo, Komae, all of Japan

[73] Assignee: Tokico Ltd., Kawasaki, Japan

[21] Appl. No.: 340,440

[22] Filed: Apr. 19, 1989

[30] Foreign Application Priority Data

Apr. 20, 1988 [JP]  Japan .................................. 63-97410
May 20, 1988 [JP]  Japan .................................. 63-123368

[51] Int. Cl.$^5$ .......................... C08K 7/04; C08K 3/30; C08K 3/08; C08K 3/04
[52] U.S. Cl. .................................... 523/149; 523/152; 523/153; 523/155; 523/156; 523/157; 524/410; 524/423; 524/452; 524/612
[58] Field of Search ............... 523/149, 152, 153, 155, 523/156, 157; 524/410, 423, 452, 612

[56] References Cited

U.S. PATENT DOCUMENTS

| | | | |
|---|---|---|---|
| 4,374,211 | 2/1983 | Gallagher et al. | 523/153 |
| 4,758,653 | 7/1988 | Otani et al. | 528/396 |
| 4,866,157 | 9/1989 | Otani et al. | 528/230 |

*Primary Examiner*—Lewis T. Jacobs
*Attorney, Agent, or Firm*—Cushman, Darby & Cushman

[57] ABSTRACT

A brake-friction material comprising:
(a) a base material having a fiber structure for giving a high mechanical strength and a high friction coefficient to the brake-friction material;
(b) a lubricant for decreasing a wear of the brake-friction material;
(c) a filler for giving a heat stability to the brake-friction material and helping friction characteristic of the brake-friction material; and
(d) a bonding material composed;
wherein the bonding material is composed of condensed polynuclear aromatic hydrocarbon resin.

11 Claims, No Drawings

BRAKE-FRICTION MATERIAL

BACKGROUND OF THIS INVENTION

1. Field of the Invention

The present invention relates to brake-friction materials used in cars and the like, and especially relates to brake pads.

2. Prior Art

Heretofore, two kinds of brake-friction materials, asbestos brake-friction material and non-asbestos brake-friction material made of steel fiber, ceramic fiber or the like, are known as the base materials in cars and the like.

One example of the manufacture of non-asbestos brake-friction materials is the hot press process. First, steel fiber base material is mixed with graphite as a lubricant, barium sulfate and the like as a filler, and phenolic resin as a bonding material. The mixture is stirred to provide uniform mixing. Subsequently, the uniform mixture is heated and formed to the desired shape by compression molding. Hereafter, it is called a "pad" when the brake friction material formed by the above described process is arranged in the braking system.

The temperature of the brake-friction material described above reaches several hundred degrees centigrade when the braking system is successively applied on a downward slope. In order to protect the brake-friction material from damage at the high temperature, the resin bonding material must be heat resistant.

For example, poor bonding strength between the resin bonding material and graphite lubricant is one of the reasons of wear of the brake-friction material. We, the present applicants, have investigated the various conditions under which the brake-friction material functions in order to determine the characteristics mentioned above.

One of the ways to prevent the brake-friction materials from suffering the above mentioned damage and to improve abrasion resistance of the pad is to increase the amount of graphite included in the brake-friction material. The wear of the brake-friction material will decrease if the amount of graphite included in the brake-friction material is increased. However, as the abrasion resistance of the graphite-rich brake-friction material is improved, its shear strength becomes lower, because the bonding strength between graphite and phenolic resin is weak.

When the amount of graphite included in the brake-friction material is excessive, the heat conductivity of the pad increases and causes vapor lock phenomenon of hydraulic system.

In order to adjust the amount of graphite included in the brake-friction material, antimony(III) sulfide having superior heat resistance to graphite is added. When phenolic resin attains a high temperature and gas is generated for example methane and the like by heat decomposition, the gas enters between the pad and the disk. As a result, fade phenomenon (braking power is decreased) is likely to occur. If the porosity of the pad is made large, the pores will catch the gas generated from phenolic resin.

SUMMARY OF THE INVENTION

It is an object of this invention to provide brake-friction material having superior abrasion resistance, shear strength, and friction characteristics.

According to the invention, a brake-friction material comprising:

(a) a base material having a fiber structure for giving a high mechanical strength and a high friction coefficient to the brake-friction material;

(b) a lubricant for decreasing a wear of the brake-friction material;

(c) a filler for giving a heat stability to the brake-friction material and helping friction characteristic of the brake-friction material; and (d) a bonding material composed;

wherein the bonding material is composed of condensed polynuclear aromatic hydrocarbon resin, are provided. The process for the production of condensed polynuclear aromatic hydrocarbon resin is published in U.S. Pat. No. 4758653. Hereafter, condensed polynuclear aromatic resin is abbreviated to "COPNA resin". Furthermore, according to this invention, the porosity of the pad in particular is kept small in order to maintain abrasion resistance, and antimony(III) sulfide is used as one of the lubricants in order to develop heat resistance and to avoid vapor lock phenomenon.

The condensation polymer whose raw material is coal-tar pitch largely represented by compounds such as (A) or (B) as follows:

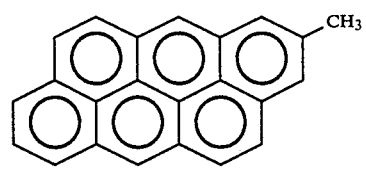

(A) Coal-tar pitch $C_{23}H_{14}$

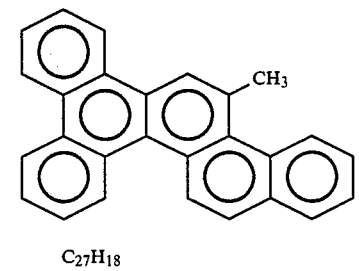

(B) Coal-tar pitch $C_{27}H_{18}$ is used as pitch group COPNA resin. Other COPNA resins, for example, pyrene/phenanthrene group COPNA resin whose raw material is pyrene/phenanthrene and the like are also applied. The reasons why COPNA resin is used will be explained.

(1) COPNA resin has a condensed polynuclear structure which is similar to the structure of graphite used as a lubricant. The bond strength between COPNA resin and graphite will be expected to be strong because both structures are similar to each other. As a result, the amount of graphite can be increased when COPNA resin is used as the bonding material. Furthermore, the suitable sliding between the brake-friction material and disks is improved while keeping shear strength and without reducing braking power. The wear of the brake-friction material can be decreased and noise (squeal) output can be reduced.

(2) COPNA resin has better heat resistance than phenolic resin. During braking, the amount of the decomposed gas is smaller with COPNA resin than with phenolic resin. Many pores to catch the generated gas are not needed in the pad. The low porosity of the pad avoids deterioration of the mechanical strength and diminishing the abrasion resistance of the brake-friction material.

The amount of antimony(III) sulfide as one of the lubricants is in the range from 5% to 20% by weight of the brake-friction material. When the amount of antimony(III) sulfide is below 5%, the effect of improving the abrasion resistance in the pad can not be achieved. When the amount of antimony(III) sulfide is above 20%, the melted antimony(III) sulfide escapes into the space between the pad and the disk and fade phenomenon results because antimony(III) sulfide, which has a melting point of 550° C., melts and enters the area between the pad and the disk if the temperature of the pad is high.

In addition, not only graphite but also solid lubricant ($WS_2$, $MoS_2$) is used and soft metals such as copper, tin, and the like are employed as its bonding material. The base material is selected from asbestos, metallic fiber, ceramic fiber, and the like.

DETAILED DESCRIPTION OF THE INVENTION

Brake-friction materials according to this invention were formed and their effect, for example abrasion resistance, shear strength, and noise (squeal) output, was tested.

At first, the pitch group COPNA resin was focused on as the bonding material and was compared with phenolic resin and pyrene/phenanthrene group COPNA resin. The amount of graphite was doubled to twice in some cases.

The process of forming the brake-friction material is illustrated as follows.

(1) Steel fabric as a base material, pitch group COPNA resin as a bonding material, graphite as a lubricant, barium sulfate as a filler, and others (for example, silica alumina powder and the like) were prepared.

(2) All of the above mentioned materials were blended in the ratios shown in Table 1. After stirring the mixture by means of a mixer, the mixture was put into metallic molds and heated under compression molding. As a result, the brake-friction materials (a) and (b) were formed.

The molding was conducted at a temperature of 210° C. and at a pressure of 400 kgf/cm$^2$.

The abrasion resistance of the brake-friction materials (a) and (b) formed by the above described process was tested according to the "Braking Device Dynamometer Test Procedure-Passenger Car" (Standard C-406 of Japanese Automobile Standards Organization). The shear strength was tested according to the "Physical Properties of Friction Materials Test Procedure" (Standard C-444 of Japanese Automobile Standards Organization). To Table 1 were added the results of the following tests: wear, shear strength, and noise (squeal) output of the brake-friction materials (a) and (b).

In order to compare with the brake-friction materials (a) and (b), the brake-friction materials (1), (2) and brake-friction materials (3), (4) having different bonding materials from brake-friction materials' (a) and (b) were formed under the same conditions as that of brake-friction materials (a) and (b) (with the proviso that the heating temperature of the brake-friction materials (1) and (3) was set at 150° C.). The brake-friction materials (1) through (4) thus obtained were tested under the same conditions as the brake-friction materials (a) and (b).

The difference between the brake-friction materials (a), (1), and (2) and the brake-friction materials (b), (3), and (4) is the amount of graphite added to the mixtures. The brake-friction materials (a), (1), and (2) have 10% by weight of graphite, and the brake-friction materials (b), (3), and (4) have 20% by weight of graphite as shown in Table 1. It was clear that the wear characteristic, the shear strength, and the noise (squeal) output characteristics were different when the amount of graphite added to the mixture was doubled.

The results of the tests shown in Table 1 will be explained in the following section.

It is known that both brake-friction materials (a) and (b) have less wear (higher abrasion resistance) than the brake-friction materials (1), (2), (3), and (4), and that increasing the amount of graphite does not cause reduction of the shear strength. Furthermore, lower noise (squeal) output was observed in both brake-friction materials (a) and (b).

While the present embodiments involve formation by the hot press process, the same brake-friction material can be formed by the press forming process (after condensation molding at room temperature, then baking the condensation mold product).

Brake-friction materials according to this invention were formed and their effect (wear resistance, friction) was confirmed.

The pyrene/phenanthrene group COPNA resin was focused on as the bonding material and was compared with phenolic resin. The amount of antimony(III) sulfide was varied.

The process of forming the brake-friction material is illustrated as follows.

(1) Steel fiber as a base material, pyrene/phenanthrene group COPNA resin as a bonding material, graphite and antimony(III) sulfide as a lubricant, barium sulfate as a filler, and others (for example, silica alumina powder and the like) were prepared.

(2) All of the above mentioned material was blended in the ratios shown in Table 2. After stirring the mixture by means of a mixer, the mixture was pre-molded at room temperature under generally 300 kgf/cm$^2$, and heated at 160° C. under 500 kgf/cm$^2$ with compression molding, and then cured at generally 200° C. under atmospheric pressure for an hour. As a result, the brake-friction materials (c) through (e) were formed.

The abrasion resistance and friction of the brake-friction materials (c) through (e) formed by the above described process was tested according to the "Braking Device Dynamometer Test Procedure-Passenger Car" (Standard C-406 of Japanese Automobile Standards Organization). The friction coefficients $\mu$ indicated in Table 3 reached the minimum value in the tests several times. The value of wear and the brake fluid temperature during braking reached the maximum value in the tests several times. The value of porosity was determined according to the "Physical Properties of Friction Materials Test Procedure" (Standard C-444 of Japanese Automobile Standards Organization).

In order to compare the above mentioned brake-friction materials (c) through (e) with the others (comparative brake-friction materials), the brake-friction materials (5) through (14) were formed under the same process and tested under the same conditions as the brake-friction materials (c) through (e). The brake-friction materials (5) through (7) have phenolic resin instead of COPNA resin which is used in the brake-friction materials (c) through (e). The brake-friction materials (8) through (10) have phenolic resin instead of COPNA resin and have porosity 5% greater than the brake-friction materials (c) through (e). The brake-friction materials (11) through (14) have COPNA resin and various ratios of graphite and antimony(III) sulfide. For example, the brake-friction material (13) has antimony(III) sulfide outside of the range from 5% to 20% by weight.

The results of the tests are shown in Table 3. The brake-friction materials (5) through (7), each containing phenolic resin as the bonding material, have a low friction coefficient $\mu$. The brake-friction materials (8) through (10), each including phenolic resin as the bonding material and having high porosity, have a great amount of wear and minimumly improved friction. The brake-friction material (11) including no antimony(III) sulfide has superior friction characteristic and bad abrasion resistance. The brake-friction material (12) including a great amount of graphite has both good friction characteristic and good abrasion resistance, but the brake fluid temperature is high during braking thereby causing vapor lock phenomenon because graphite has good heat conductivity. The brake-friction material (13) has the same problems regarding abrasion resistance as the brake-friction material (11). The brake-friction material (14) including a great amount of antimony(III) sulfide has good abrasion resistance and the same problems regarding friction as the brake-friction materials (5) through (7).

In contrast with the comparative brake-friction materials, the brake-friction materials (c) through (e) maintain all the characteristics of abrasion resistance, improved friction, and heat resistance.

It is clear that the brake-friction material having characteristics of abrasion resistance, improved friction, and heat resistance is gained when COPNA resin is used as the bonding material and antimony(III) sulfide is added as one of the lubricants in the amount of 5% to 20% by weight of the brake-friction material.

TABLE 1

| Resin as Bonding Material | Brake-friction Material (a) Pitch group COPNA Resin | Brake-friction Material (1) Phenol Resin | Brake-friction Material (2) Pyrene/Phenanthrolene group Resin | Brake-friction Material (b) Pitch group Resin | Brake-friction Material (3) Phenol Resin | Brake-friction Material (4) Pyrene/Phenanthrolene group Resin |
|---|---|---|---|---|---|---|
| Ratio by Weight | | | | | | |
| Steel Fiber | 550 | 550 | 550 | 550 | 550 | 550 |
| Graphite | 100 | 100 | 100 | 200 | 200 | 200 |
| Bonding Material | 110 | 110 | 110 | 110 | 110 | 110 |
| Barium Sulfate | 140 | 140 | 140 | 140 | 140 | 140 |
| Adjunct | 50 | 50 | 50 | 30 | 30 | 30 |
| After Dynamo Testing | | | | | | |
| Amount of Wear (mm) | 0.75 | 0.90 | 0.80 | 0.40 | 0.85 | 0.70 |
| Shear Strength (kgf/cm$^2$) | 78 | 83 | 75 | 75 | 50 | 70 |
| Noise (squeal) Output (the best value: 4, the worst value: 0) | 2 | 1 | 2 | 4 | 2 | 4 |

TABLE 2

| | Steel Fiber (wt %) | COPNA Resin (wt %) | Phenol Resin (wt %) | Graphite (wt %) | Antimony (III) Sulfide (wt %) | Barium Sulfate (wt %) | Alumina Powder (wt%) | Porosity (%) |
|---|---|---|---|---|---|---|---|---|
| Example | | | | | | | | |
| (c) | 40 | 15 | — | 10 | 5 | 29.9 | 0.1 | 10 |
| (d) | 40 | 15 | — | 10 | 10 | 24.9 | 0.1 | 10 |
| (e) | 40 | 15 | — | 10 | 20 | 14.9 | 0.1 | 10 |
| Comparative Example | | | | | | | | |
| (5) | 40 | — | 15 | 10 | 5 | 29.9 | 0.1 | 10 |
| (6) | 40 | — | 15 | 10 | 10 | 24.9 | 0.1 | 10 |
| (7) | 40 | — | 15 | 10 | 20 | 14.9 | 0.1 | 10 |
| (8) | 40 | — | 15 | 10 | 5 | 29.9 | 0.1 | 15 |
| (9) | 40 | — | 15 | 10 | 10 | 24.9 | 0.1 | 15 |
| (10) | 40 | — | 15 | 10 | 20 | 14.9 | 0.1 | 15 |
| (11) | 40 | 15 | — | 10 | 0 | 34.9 | 0.1 | 10 |
| (12) | 40 | 15 | — | 20 | 0 | 24.9 | 0.1 | 10 |
| (13) | 40 | 15 | — | 10 | 3 | 31.9 | 0.1 | 10 |
| (14) | 40 | 15 | — | 10 | 30 | 4.9 | 0.1 | 15 |

TABLE 3

| | Friction Coefficient $\mu$ | Amount of Wear (mm) | Brake-fluid Temperature (°C.) |
|---|---|---|---|
| Example | | | |
| (c) | 0.31 | 0.58 | 80 |
| (d) | 0.28 | 0.49 | 82 |
| (e) | 0.26 | 0.40 | 83 |
| Comparative Example | | | |
| (5) | 0.20 | 0.80 | 81 |
| (6) | 0.18 | 0.71 | 81 |
| (7) | 0.16 | 0.60 | 82 |
| (8) | 0.27 | 1.05 | 79 |
| (9) | 0.25 | 0.93 | 80 |
| (10) | 0.24 | 0.85 | 80 |
| (11) | 0.32 | 0.78 | 77 |
| (12) | 0.30 | 0.60 | 124 |
| (13) | 0.31 | 0.74 | 79 |
| (14) | 0.21 | 0.40 | 83 |

What is claimed is:

1. A brake-friction material comprising:

(a) a base material having a fiber structure for giving high mechanical strength and high friction coefficient to the brake-friction material;

(b) a lubricant for decreasing wear of the brake-friction material;

(c) a filler for giving heat stability to the brake-friction material and helping friction characteristic of the brake-friction material; and (d) a bonding material composed of condensed polynuclear aromatic hydrocarbon resin.

2. A brake-friction material according to claim 1, wherein the lubricant includes graphite.

3. A brake-friction material according to claim 2, wherein the lubricant further includes antimony(III) sulfide.

4. A brake-friction material according to claim 3, wherein the amount of antimony(III) sulfide is from 5 to 20 percent by weight of the brake-friction material.

5. A brake-friction material according to claim 1, wherein the bonding material is made of pitch.

6. A brake-friction material according to claim 1, wherein the base material is asbestos.

7. A brake-friction material according to claim 1, wherein the base material is metallic fiber.

8. A brake-friction material according to claim 1, wherein the base material is ceramic fiber.

9. A brake-friction material according to claim 1, wherein the filler is barium sulfate.

10. A brake-friction material comprising:

(a) metallic fiber as a base material for giving high mechanical strength and high friction coefficient to the brake-friction material;

(b) graphite and antimony(III) sulfide as a lubricant for decreasing wear of the brake-friction material;

(c) barium sulfate as a filler for giving heat stability to the brake-friction material and helping friction characteristic of the brake-friction material; and (d) condensed polynuclear aromatic hydrocarbon resin as a bonding material.

11. A brake-friction material according to claim 10, wherein the amount of antimony(III) sulfide is from 5 to 20 percent by weight of the brake-friction material.

* * * * *